(12) United States Patent
Feng et al.

(10) Patent No.: US 8,578,773 B1
(45) Date of Patent: Nov. 12, 2013

(54) TRAVEL DIRECTION DETECTION

(71) Applicant: Google Inc., Mountain View, CA (US)

(72) Inventors: Chao Feng, Beijing (CN); Hongji Bao, Beijing (CN); Yaoting Liu, Beijing (CN)

(*) Notice: Subject to any disclaimer, the term of this patent is extended or adjusted under 35 U.S.C. 154(b) by 0 days.

(21) Appl. No.: 13/627,296

(22) Filed: Sep. 26, 2012

(51) Int. Cl.
*G01P 15/00* (2006.01)

(52) U.S. Cl.
USPC .............................................. 73/488; 73/510

(58) Field of Classification Search
USPC .............. 73/488, 507, 492, 509, 510, 514.01, 73/527
See application file for complete search history.

(56) References Cited

U.S. PATENT DOCUMENTS

| | | | | |
|---|---|---|---|---|
| 3,824,386 | A * | 7/1974 | Offereins | 702/153 |
| 6,590,536 | B1 * | 7/2003 | Walton | 342/463 |
| 6,790,178 | B1 * | 9/2004 | Mault et al. | 600/300 |
| 7,467,060 | B2 * | 12/2008 | Kulach et al. | 702/141 |
| 7,670,263 | B2 * | 3/2010 | Ellis et al. | 482/8 |
| 8,255,720 | B1 * | 8/2012 | Conway | 713/320 |
| 8,260,999 | B2 * | 9/2012 | Ganesh et al. | 710/303 |
| 8,352,211 | B2 * | 1/2013 | Vock et al. | 702/141 |
| 8,392,735 | B2 * | 3/2013 | Mucignat et al. | 713/323 |
| 8,465,397 | B2 * | 6/2013 | Saalasti et al. | 482/9 |
| 2003/0109988 | A1 * | 6/2003 | Geissler et al. | 701/213 |
| 2005/0259002 | A1 * | 11/2005 | Erario et al. | 342/357.07 |
| 2006/0020177 | A1 * | 1/2006 | Seo et al. | 600/300 |
| 2007/0287596 | A1 * | 12/2007 | Case et al. | 482/8 |
| 2010/0161271 | A1 * | 6/2010 | Shah et al. | 702/141 |
| 2011/0208357 | A1 * | 8/2011 | Yamauchi | 700/258 |
| 2011/0227748 | A1 * | 9/2011 | Schaible et al. | 340/686.6 |
| 2012/0002822 | A1 * | 1/2012 | Peissig et al. | 381/74 |
| 2012/0021758 | A1 * | 1/2012 | Gum et al. | 455/456.1 |
| 2012/0114132 | A1 * | 5/2012 | Abrahamsson et al. | 381/74 |
| 2012/0277040 | A1 * | 11/2012 | Vincent et al. | 473/570 |

* cited by examiner

*Primary Examiner* — Peter Macchiarolo
*Assistant Examiner* — Samir M Shah
(74) *Attorney, Agent, or Firm* — Troutman Sanders, LLP; James E. Schutz; Christopher W. Glass (57) ABSTRACT

A device and method of determining a travel direction of a mobile device carried by a user are disclosed. The method includes determining a line along which the mobile device is traveling, where the determining may be based on sensed acceleration of the mobile device. A walking style of the user traveling with the mobile device may be determined. The sensed acceleration may be resolved into at least two mutually perpendicular components. A first component may be substantially parallel with gravity, and a second component may be orthogonal to the first component. The travel direction of the mobile device along the travel line may be determined based on a user's walking style and the resolved sensed acceleration. The determining of the line may include applying a linear least square fitting method to a plurality of acceleration readings obtained from at least one inertial navigation sensor.

14 Claims, 8 Drawing Sheets

TRAVEL DIRECTION DETECTION

TECHNICAL FIELD

The disclosed embodiments generally relate to a device and method of tracking indoor navigation using a mobile device, and more specifically, a device and method of using the device to detect walking direction using wave pattern of acceleration.

BACKGROUND

Navigation systems on mobile devices, such as mobile telephones with mapping applications, are becoming commonplace. One problem with utilizing such systems indoors is detecting a user's walking direction. In outdoor environments, one can use a Global Positioning System ("GPS") to detect a walking direction. However, GPS signals are typically unavailable in an indoor environment.

Various communication technologies can be implemented for utilizing indoor navigation systems. One technology is a dead reckoning technique, such as attaching inertial sensors on a user's body. However, this technique is not appropriate for indoor navigation in instances when the user needs to hold the mobile device to view a map. Other indoor communication technologies include, for example, Wi-Fi and Bluetooth technologies. However, these technologies require large up-front setup costs and, often times, laborious site surveys in order to implement an indoor navigation system.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A device and method are disclosed for determining a travel direction of a mobile device carried by a user. The method may include determining a line along which the mobile device is traveling, where the determining may be based on sensed acceleration of the mobile device. A walking style of the user traveling with the mobile device may be determined. The sensed acceleration may be resolved into at least two mutually perpendicular components. A first component may be substantially parallel with gravity, and a second component may be orthogonal to the first component. The travel direction of the mobile device along the travel line may be determined based on a user's walking style and the resolved sensed acceleration.

These and other advantages, aspects and features of the present disclosure, as well as details of illustrated implementation(s) thereof, will be more fully understood from the following description and drawings.

BRIEF DESCRIPTION OF THE FIGURES

The accompanying figures are provided to illustrate the disclosed embodiments, are not considered limiting, and for which.

DETAILED DESCRIPTION

Figure 1:
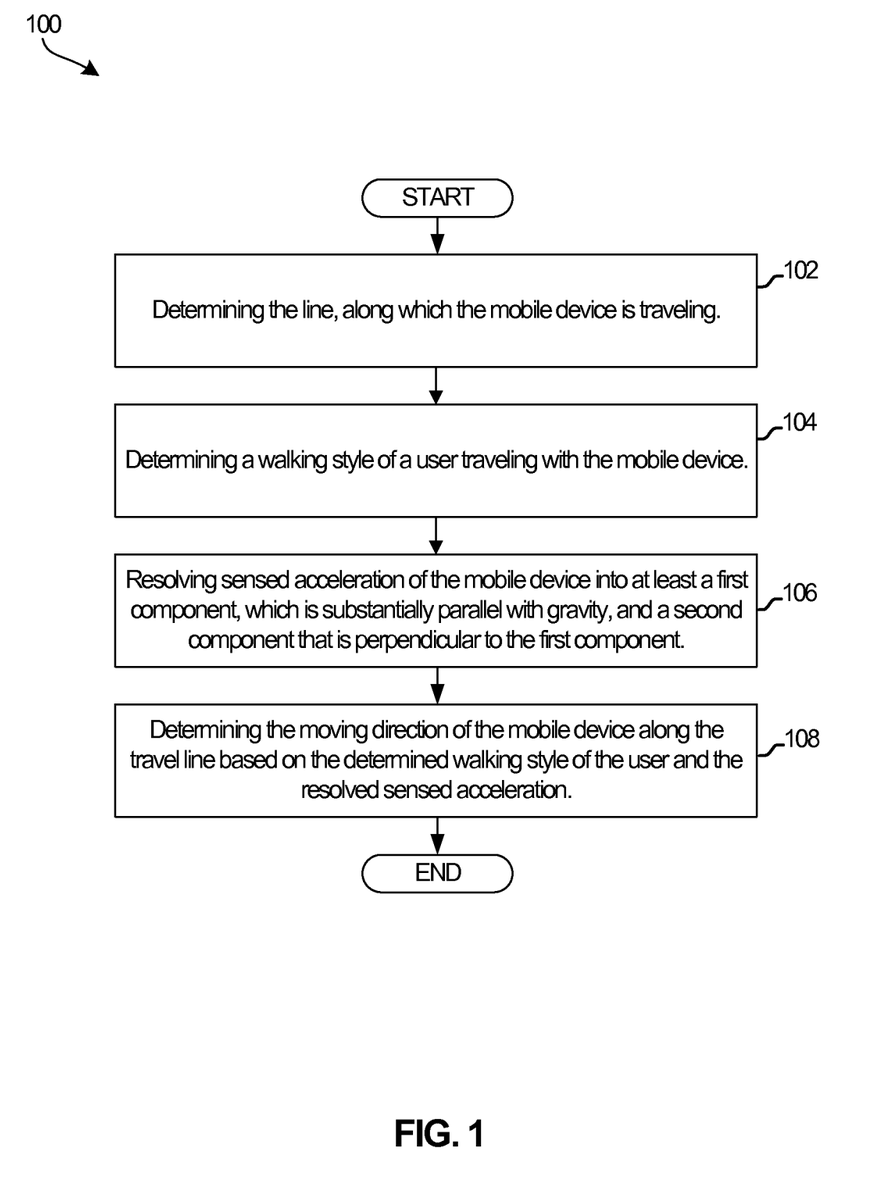
FIG. 1 is a flowchart of example method for determining a travel direction of a mobile device carried by a user, in accordance with an example embodiment of the disclosure.

FIG. 1 is a flowchart of example method 100 for determining a travel direction of a mobile device carried by a user, in accordance with an example embodiment of the disclosure. To derive a user's walking direction, four analyses may be performed. Referring to FIG. 1, the first analysis may be performed at 102, when the line, along which the mobile device is traveling, may be determined. The second analysis may be performed at 104, when a walking style of the user traveling with the mobile device may be determined. The third analysis may be performed at 106, when sensed acceleration of the mobile device may be resolved into at least a first component, which is substantially parallel with gravity, and a second component that is perpendicular to the first component. The fourth analysis may be performed at 108, when the moving direction of the mobile device along the travel line may be determined based on the determined walking style of the user and the resolved sensed acceleration. Each of these four analyses is discussed in further detail below.

Figure 2:
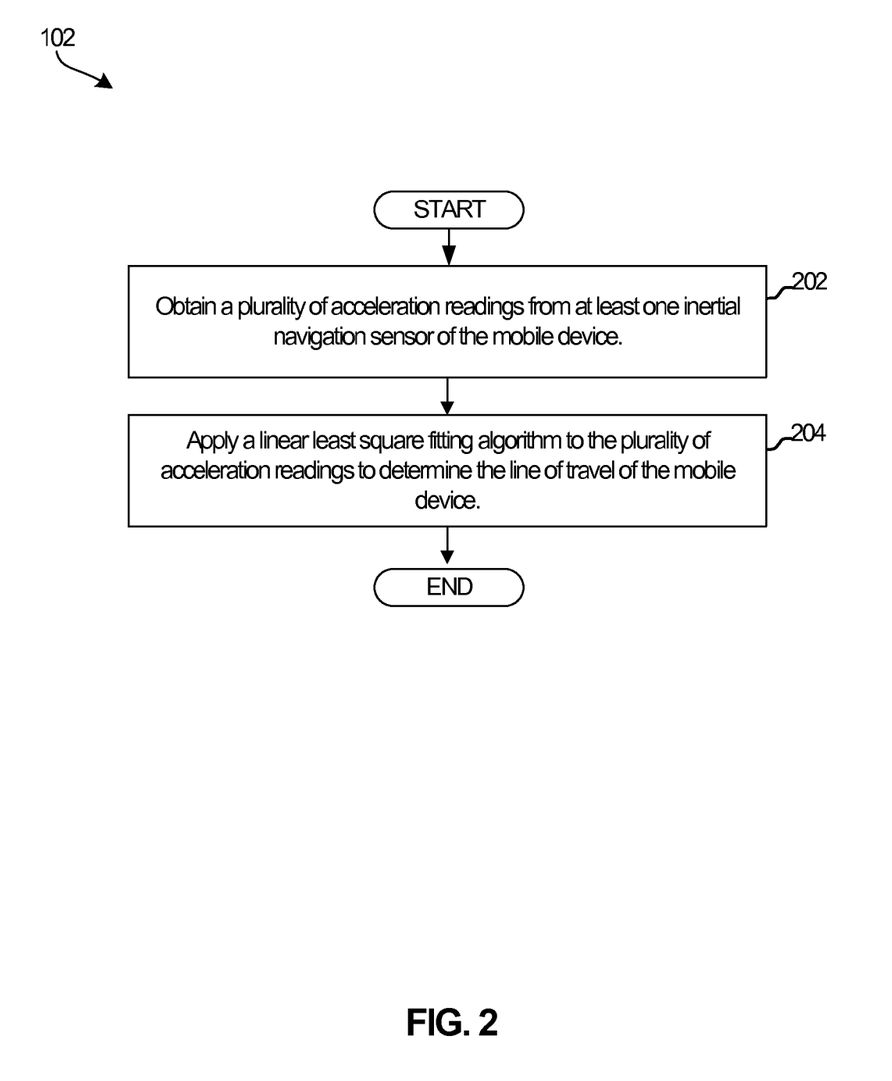
FIG. 2 is a flowchart of example method for determining a line along which the mobile device is traveling, in accordance with an example embodiment of the disclosure.

FIG. 2 is a flowchart of example method for determining a line along which the mobile device is traveling, in accordance with an example embodiment of the disclosure. Referring to FIGS. 2 and 6-8, the analysis 102 of FIG. 1 may start at 202, when a plurality of acceleration readings may be obtained from at least one inertial navigation sensor of the mobile device. For example, mobile device 10 may include internal circuitry 16, such as one or more inertial navigation sensors, which may be used to generate the plurality of acceleration readings.

At 204, a linear least square fitting algorithm may be applied to the plurality of acceleration readings to determine the line of travel of the mobile device 10. More specifically, after the plurality of acceleration readings from the internal circuitry 16, the line (or path) of travel 12, along which the user 14 is walking. Even though a linear least square fitting algorithm is applied to a plurality of acceleration readings from an inertial navigation sensor of a mobile device to determine the device line of travel, other algorithms or methods may also be used to determine the line of travel based on acceleration readings.

In accordance with an example embodiment of the disclosure, the linear least square fitting algorithm applied to the plurality of acceleration readings may be implemented as executable software stored on control circuitry, which may be part of, for example, the internal circuitry 16 within the mobile device 10. The control circuitry may also contain software required to perform the above noted steps, which are further detailed below. This control circuitry may be in the form of Random Access Memory (RAM), Read Only Memory (ROM), microprocessors, and other typical circuitry that is adapted to store, execute and process the results of such executable software.

Figure 3:
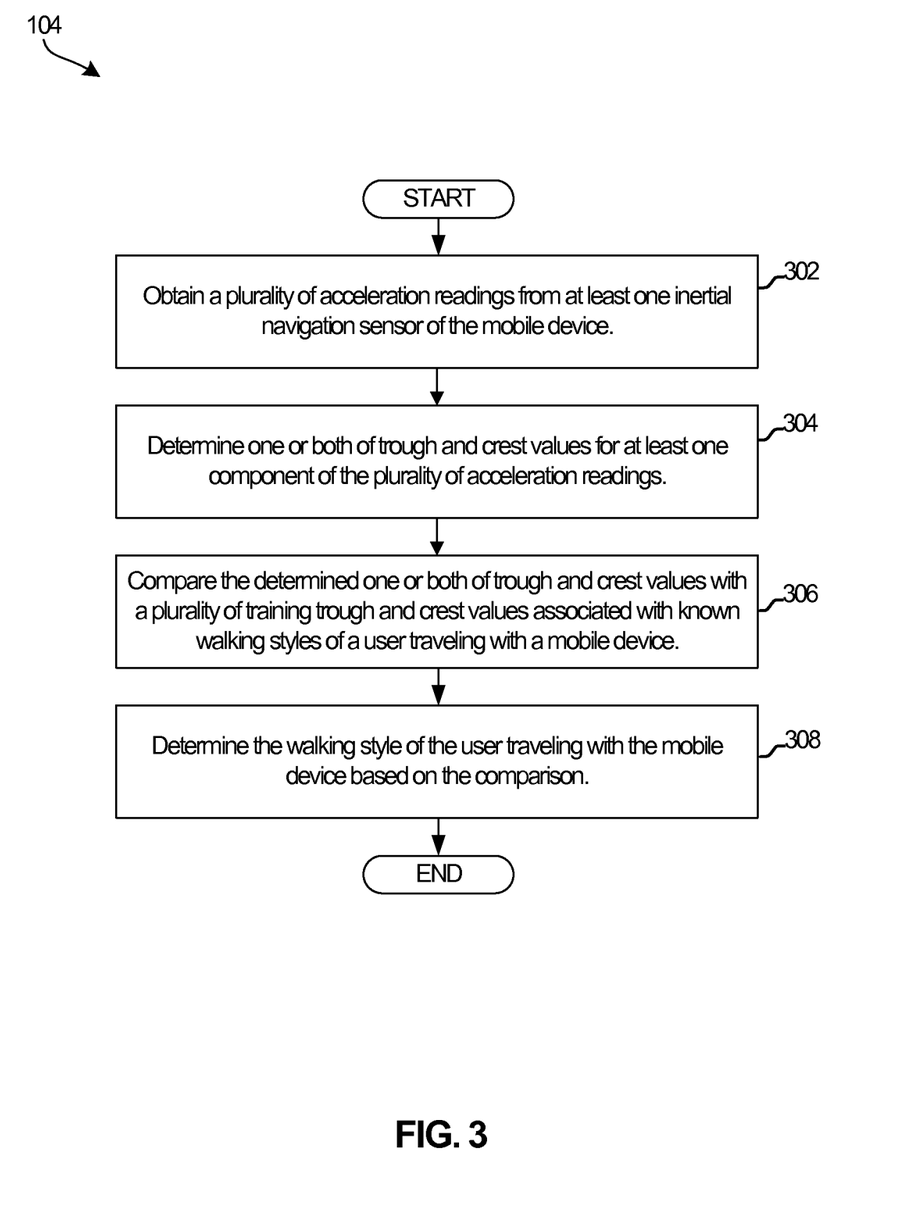
FIG. 3 is a flowchart of example method for determining a walking style of a user travelling with the mobile device, in accordance with an example embodiment of the disclosure.
Figure 6:
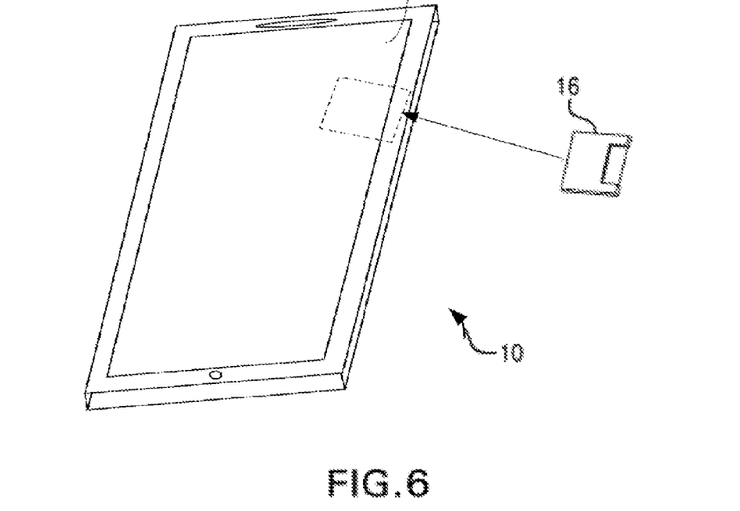
FIG. 6 illustrates a mobile device utilizing the methods illustrated in FIGS. 1-5.
Figure 7:
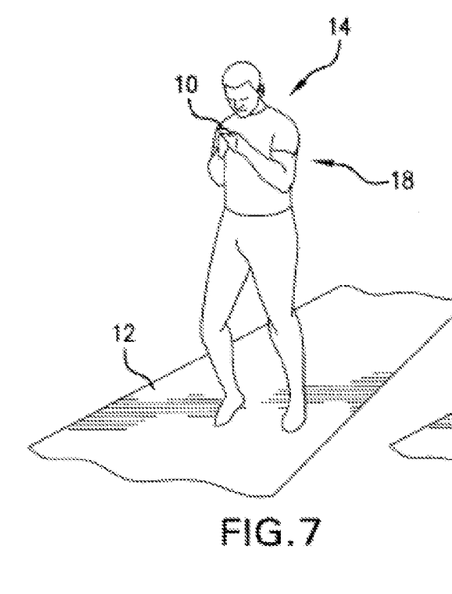
FIGS. 7-8 illustrate a user utilizing the mobile device of FIG. 6 in accordance with a first and second walking style, in accordance with an example embodiment of the disclosure.
Figure 8:
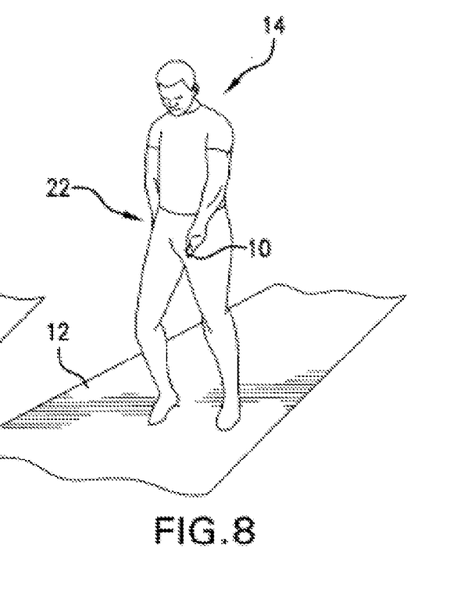

FIG. 3 is a flowchart of example method for determining a walking style of a user travelling with the mobile device, in accordance with an example embodiment of the disclosure. FIG. 6 illustrates a mobile device utilizing the methods illustrated in FIGS. 1-5. FIGS. 7-8 illustrate a user utilizing the mobile device of FIG. 6 in accordance with a first and second walking style, in accordance with an example embodiment of the disclosure.

As indicated above, the analysis 104 of FIG. 1 relates to determining a user's walking style. Such determination may be based on analyzing the user's handling of the mobile device while walking. Such handling typically is one of a variety of predetermined different walking styles, as illustrated in reference to FIGS. 7-8.

A first predetermined and typical walking style, illustrated in FIG. 7, is a user 14 holding a mobile device 10 steadily proximate to the user's chest or torso area 18. This enables simultaneous walking along a walking path 12, which may be anywhere in a person's house or other indoor environment, such as a mall, airport or workplace, and viewing of the screen 20 of the mobile device 10.

A second predetermined and typical walking style, illustrated in FIG. 8, is waving the mobile device 10 in the user's hands while walking. In this configuration, the user 14 may have the mobile device 10 closer to their hip region 22 or otherwise at their side.

Referring to FIGS. 3 and 6-8, the analysis 104 of FIG. 1 may start at 302, when a plurality of acceleration readings may be obtained from at least one inertial navigation sensor of the mobile device. For example, the internal circuitry 16 of mobile device 10 may include one or more inertial navigation sensors, which may be used to generate the plurality of acceleration readings.

At 304, one or both of trough and crest values for at least one component of the plurality of acceleration readings may be determined. For example and in reference to FIGS. 10-11, trough values (e.g., T1 and T2) or crest values (not illustrated) may be determined for a vertical component of acceleration (V) compensated for gravity (e.g., V-G is used along the x-axis).

At 306, the determined one or both of trough and crest values may be compared with a plurality of training trough and crest values associated with known walking styles of a user traveling with a mobile device. For example, specific trough or crest values (e.g., training values) of the vertical component of acceleration may have been previously obtained for both walking styles illustrated in FIGS. 7-8. Such training values may then be saved as part of a ROM memory of device 10, and used for determining a current walking style of the user holding the device 10 (e.g., by comparison).

At 308, the walking style of the user (e.g., first walking style, as illustrated in FIG. 7, or a second walking style, as illustrated in FIG. 8) traveling with the mobile device may be determined based on the comparison.

Even though only two walking styles are identified and described in relation to FIGS. 7-8, the present disclosure may not be limited in this regard and other walking styles may be identified using the above methodology as well. Additionally, changing between walking styles may also be determined. Alternatively, a user may manually input their walking style using the device 10.

Figure 4:
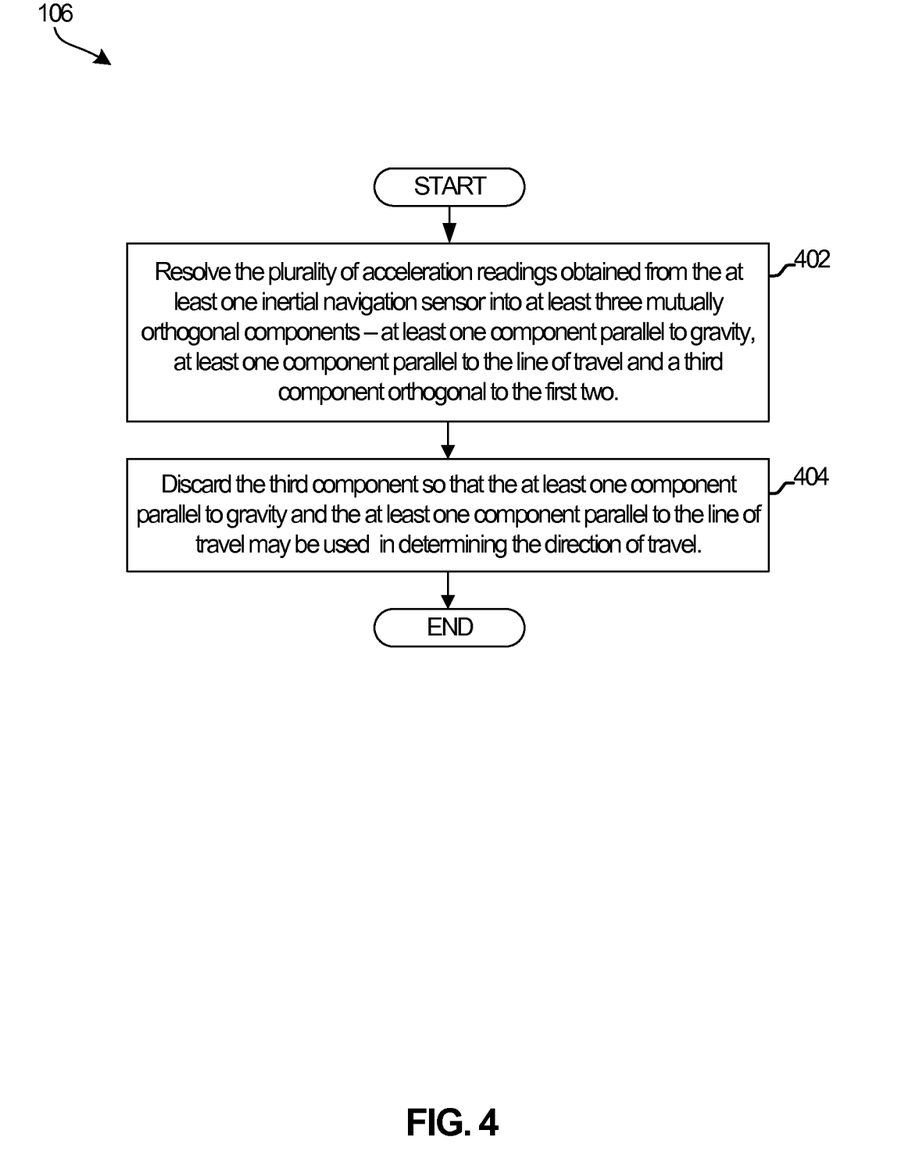
FIG. 4 is a flowchart of example method for resolving sensed acceleration of the mobile device, in accordance with an example embodiment of the disclosure.
Figure 9:
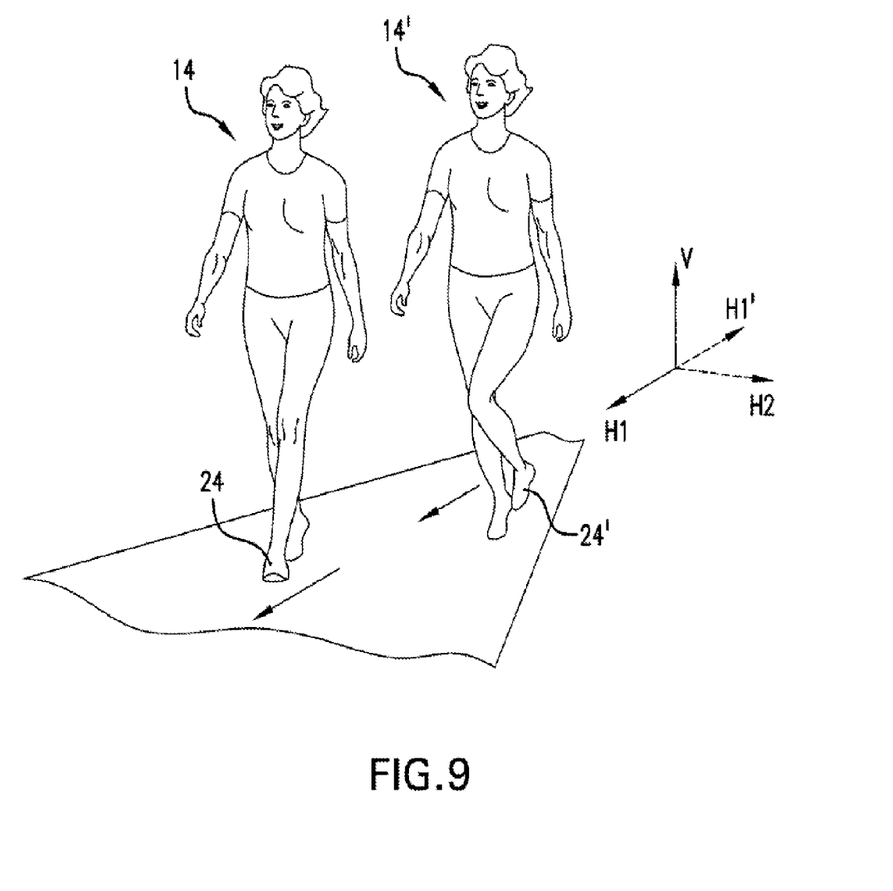
FIG. 9 illustrates various acceleration components associated with a walking user, in accordance with an example embodiment of the disclosure.

FIG. 4 is a flowchart of example method for resolving sensed acceleration of the mobile device, in accordance with an example embodiment of the disclosure. FIG. 9 illustrates various acceleration components associated with a walking user, in accordance with an example embodiment of the disclosure.

At 402, the plurality of acceleration readings obtained from the at least one inertial navigation sensor (e.g., internal circuitry 16) may be resolved into at least three mutually orthogonal components—at least one component parallel to gravity, at least one component parallel to the line of travel and a third component orthogonal to the first two. Typically, an acceleration reading from a mobile device (e.g., a cell phone) is a three-dimension vector, where the three dimensions are all relative to the mobile device (and not the user holding the device). Therefore, since acceleration relative to the user moving direction and gravity is desired in the present disclosure, acceleration readings obtained from the internal circuitry 16 may be resolved to achieve this purpose.

For example and in reference to FIG. 9, acceleration may be resolved into three mutually perpendicular or orthogonal components, including a vertical component "V" (parallel to gravity), a horizontal component "H1" (perpendicular to the vertical component and may be parallel to the walking direction), and a third component "H2". In this process, "H2" defines a horizontal component that is perpendicular to both the vertical component and the horizontal component. However, in the analysis provided herein, "V" and "H1" are the components relied upon for determining a walking direction along a walking line or path.

At 404, the third component (H2) may be discarded so that the at least one component (V) parallel to gravity and the at least one component (H1) parallel to the line of travel may be used in determining the direction of travel. The purpose of the "V" and "H1" values are discussed in greater detail below.

Figure 5:
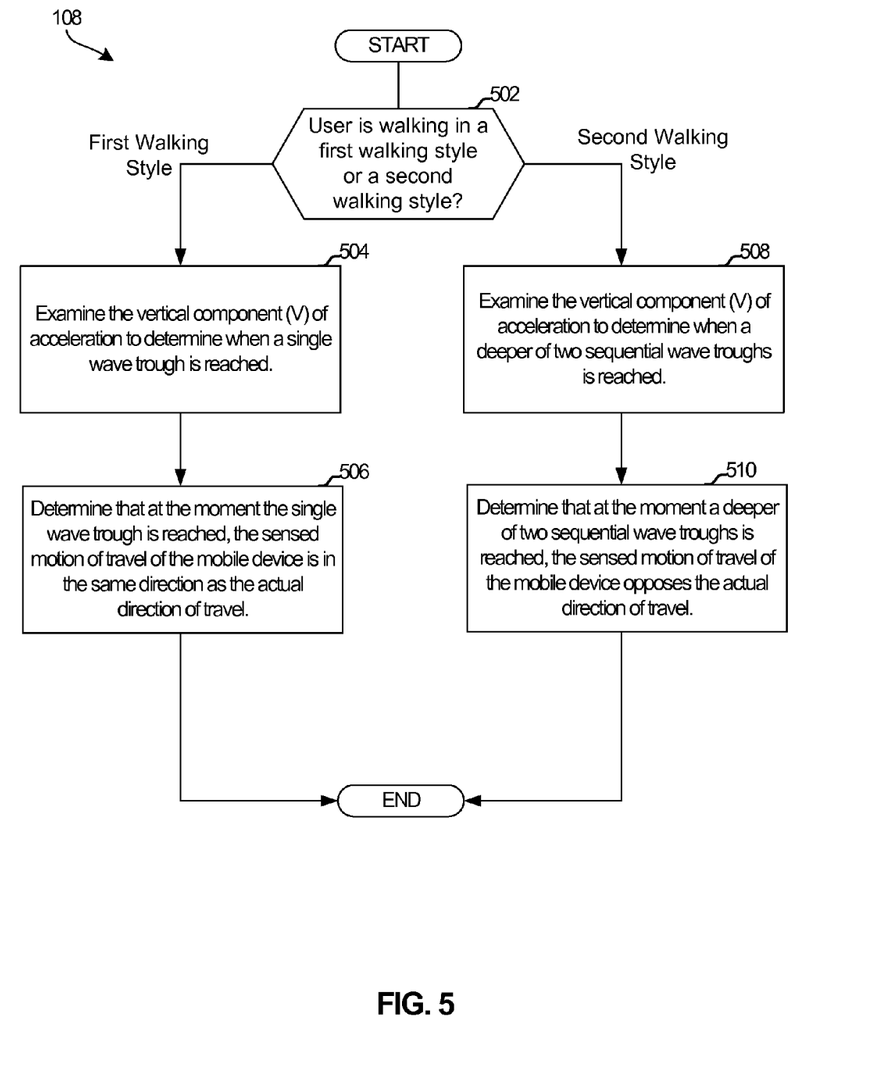
FIG. 5 is a flowchart of example method for determining the actual travel direction of the mobile device carried by the user, in accordance with an example embodiment of the disclosure.
Figure 10:
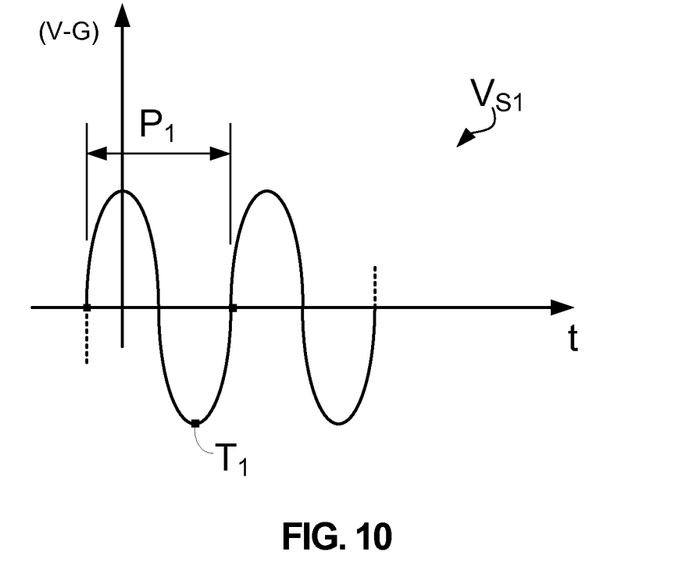
FIGS. 10-11 illustrate graphical plots of a vertical component of sensed acceleration compensated by gravity and based on user walking styles, in accordance with an example embodiment of the disclosure.
Figure 11:
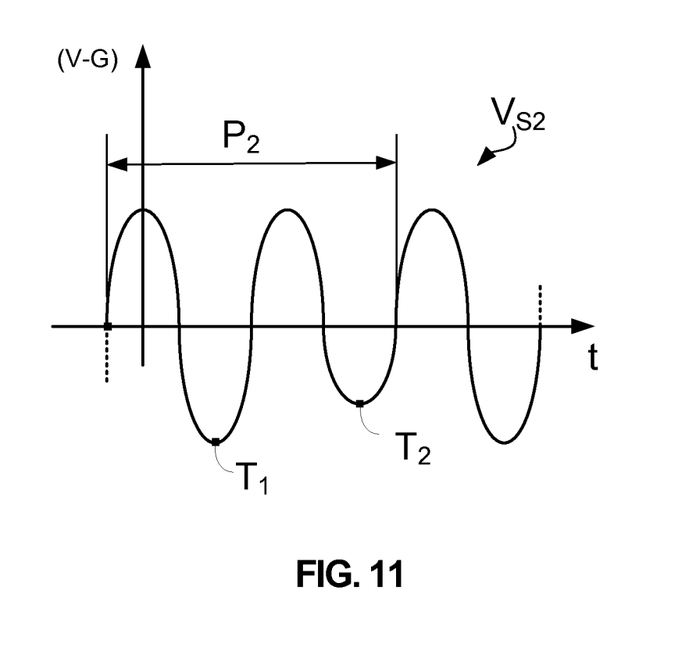

FIG. 5 is a flowchart of example method for determining the actual travel direction of the mobile device carried by the user, in accordance with an example embodiment of the disclosure. FIG. 9 illustrates various acceleration components associated with a walking user, in accordance with an example embodiment of the disclosure. FIGS. 10-11 illustrate graphical plots of a vertical component of sensed acceleration compensated by gravity and based on user walking styles, in accordance with an example embodiment of the disclosure. Since gravity (G) is in the opposite direction from the direction of the vertical component (V), the vertical component may be compensated for gravity by subtracting G from V (i.e., V-G is used along the x-axis in FIGS. 10-11.

Referring to FIGS. 5 and 9-11, the fourth analysis 108 may include determining the moving direction of the mobile device along the travel line based on the determined walking style of the user and the resolved sensed acceleration. This analysis is based on both the user's walking style and the resolved acceleration values.

At 502, it may be determined whether the user 14 is walking in a first walking style (as illustrated in FIG. 7) or a second walking style (as illustrated in FIG. 8)

For example, the "H1" component of acceleration acts along the line that the user walks. However, in either of the two identified walking styles, the "H1" component of acceleration will, at times, register a negative acceleration even if the user walks only in a forward direction. The "negative" acceleration is identified as "H1'" in FIG. 9, and it opposes the direction the user is actually walking. As will be explained, the "H1" component of acceleration is corrected by making it a function of the "V" component of acceleration.

More specifically, in either of the two identified walking styles, at certain time points in a forward stride, a foot 24 of a user 14 will hit the ground. At other points in the stride, the foot 24' of the user 14' will be at a highest point from the ground. This foot motion can be identified by analyzing the oscillations in the "V" component of acceleration when corrected for gravity G (e.g., by graphing V-G in relation to time t, as illustrated in FIGS. 10-11).

For example, the first walking style, as indicated and illustrated in FIG. 7, is the user holding the mobile device 10 steadily in hand at his or her chest 18. Graphing the vertical "V" component of the user's acceleration for the first walking style (and compensated for gravity G), and labeling the curve "Vs1" (Style 1) as provided in FIG. 10, results in a single trough "T1" in each walking period P1. This trough T1 occurs when the user's foot has hit the ground or is at its highest point. At this point of trough T1, the sensed horizontal component of acceleration is "H1'" (which is in the same direction of, but opposite to, "H1"), and the actual moving direction is in the direction of H1.

Alternatively, the second walking style, as indicated and illustrated in FIG. 8, is the user 14 holding the mobile device in his or her hand and swings his or her hand back and forth while walking. As illustrated in FIG. 11, there are two different troughs (T1 and T2) in the wave pattern defined by the "V" component of acceleration curve (where V is compensated for gravity, e.g., V-G is graphed on the x-axis, against time on the y-axis), illustrated as "Vs2" (Style 2), during a walking period P2. The first trough "T1" in Vs2 is a relatively deeper (larger) trough. The second trough "T2" in Vs2 is a relatively shallower (smaller) trough. These troughs, "T1" and "T2" in Vs2 show up in turn. When the user is walking in this walking style, the deeper trough T1 occurs when the user's foot has hit the ground or is at its highest point. At this point of deeper trough T1, the sensed horizontal component "H1" of acceleration is in the same direction of, but opposite to, the actual moving direction. That is, the sensed acceleration would be "H1", and the device would have identified the walking direction of the user as being opposite of the direction of H1 at trough T1.

If it is determined that the user 14 is walking in the first walking style (e.g., as illustrated in FIG. 7), at 504, the vertical component (V) of acceleration (when compensated by gravity G) may be examined to determine when a single trough is reached (i.e., detect trough T1 in graph Vs1). At 506, it may be determined that at the moment the single wave trough T1 is reached, the sensed motion of travel of the mobile device (component H1) is in the same direction as the actual direction of travel.

If it is determined that the user 14 is walking in the second walking style (e.g., as illustrated in FIG. 8), at 508, the vertical component (V) of acceleration (when compensated for gravity G) may be examined to determine when a deeper of two sequential wave troughs (e.g., T1 and T2) is reached. At 510, it may be determined that at the moment a deeper of two sequential wave troughs is reached (e.g., trough T1), the sensed motion of travel (H1) of the mobile device opposes the actual direction of travel.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining a travel direction of a mobile device carried by a user.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

The above represents an embodiment of the disclosure and is not intended to be limiting. The scope of protection related to the disclosure is more fully understood by reviewing the accompanying claims in view of the figures.

We claim:

1. A method comprising:
   determining, based on sensed acceleration of a mobile device carried by a user, a line along which the mobile device is traveling, comprising applying a linear least square fitting method to a plurality of acceleration readings obtained from at least one inertial navigation sensor of the mobile device to sense motion along the line of travel;
   determining a walking style of the user traveling with the mobile device, comprising:
      determining at least one of trough and crest values for at least one component of the sensed acceleration; and
      comparing the determined at least one of the trough and crest values with a plurality of training trough and crest values associated with known walking styles of other users traveling with other respective mobile devices;
   resolving the sensed acceleration into at least two mutually-perpendicular components comprising a first component that is substantially parallel with gravity and a second component that is orthogonal to the first component; and determining the travel direction of the mobile device along the travel line based on the determined walking style of the user and the at least two mutually-perpendicular components of the sensed acceleration.

2. The method of claim 1, wherein determining the walking style of the user comprises determining that the walking style of the user is one of the known walking styles, based on the comparison of the determined at least one of the trough and crest values with the plurality of training trough and crest values.

3. The method of claim 2, wherein determining the walking style of the user comprises determining that the walking style of the user corresponds to a first walking style wherein the user walks with the mobile device steady and proximate to the torso of the user.

4. The method of claim 3, comprising:
determining, within a period of time, when a single wave trough of the first component is reached; and
responsive to determining that the single wave trough of the first component is reached, determining that a sensed motion of travel of the mobile device based on the second component is in the travel direction of the mobile device, wherein the first component is compensated by gravity.

5. The method of claim 2, wherein determining the walking style of the user comprises determining that the walking style of the user corresponds to a second walking style wherein the user walks with the mobile device swinging and periodically proximate to the torso of the user.

6. The method of claim 5, comprising:
determining, within a period of time, when a deeper trough of a plurality of sequential wave troughs of the first component is reached; and
responsive to determining that the deeper trough of the plurality of sequential wave troughs of the first component is reached, determining that a sensed motion of travel of the mobile device based on the second component is opposite the travel direction of the mobile device, wherein the first component is adjusted according to gravity.

7. A device, comprising:
control circuitry containing programming to cause a mobile device to perform:
determining, based on sensed acceleration of the mobile device, a line along which the mobile device is traveling, comprising applying a linear least square fitting method to a plurality of acceleration readings obtained from at least one inertial navigation sensor of the mobile device to sense motion along the line of travel;
determining a walking style of a user traveling with the mobile device, comprising:
determining at least one of trough and crest values for at least one component of the sensed acceleration; and
comparing the determined at least one component of the trough and crest values with a plurality of training trough and crest values associated with known walking styles of other users traveling with other respective mobile devices;
resolving the sensed acceleration into at least two mutually-perpendicular components comprising a first component that is substantially parallel with gravity and a second component that is orthogonal to the first component; and
determining the travel direction of the mobile device along the line of travel based on the determined walking style of the user and the at least two mutually-perpendicular components of the sensed acceleration.

8. The device of claim 7, wherein circuitry determining the walking style of the user comprises determining the walking style of the user as one of the known walking styles based on the comparison of the at least one of the trough and crest values with the plurality of training trough and crest values.

9. The device of claim 8, wherein determining the walking style of the user comprises determining that the walking style of the user corresponds to a first walking style wherein the user walks with the mobile device steady and proximate to the torso of the user.

10. The device of claim 9, wherein the control circuitry contains programming to cause the mobile device to perform:
determining, within a period of time, when a single wave trough of the first component is reached; and
responsive to determining that the single wave trough of the first component is reached, determining that a sensed motion of travel of the mobile device based on the second component is in the travel direction of the mobile device, wherein the first component is adjusted according to gravity.

11. The device of claim 8, wherein determining the walking style of the user comprises determining that the walking style of the user corresponds to a second walking style wherein the user walks with the mobile device swinging and periodically proximate to the torso of the user.

12. The device of claim 11, wherein the control circuitry contains programming to cause the mobile device to perform:
determining, within a period of time, when a deeper wave trough of a plurality of sequential wave troughs of the first component is reached;
responsive to determining that the deeper wave trough of the plurality of sequential wave troughs of the first component is reached, determining that a sensed motion of travel of the mobile device based on the second component is opposite the travel direction of the mobile device.

13. A non-transitory, machine-readable storage medium having stored thereon a computer program having at least one code section executable by a machine for causing the machine to perform a method comprising:
determining, based on sensed acceleration of a mobile device, a line along which the mobile device is traveling, comprising applying a linear least square fitting method to a plurality of acceleration readings obtained from at least one inertial navigation sensor of the mobile device to sense motion along the line of travel;
determining a walking style of a user traveling with the mobile device, comprising:
determining at least one of trough and crest values for at least one component of the sensed acceleration; and
comparing the determined at least one of the trough and crest values with a plurality of training trough and crest values associated with known walking styles of other users traveling with other respective mobile devices;
resolving the sensed acceleration into at least two mutually-perpendicular components comprising a first component that is substantially parallel with gravity and a second component that is orthogonal to the first component; and
determining the travel direction of the mobile device along the line of travel based on the determined walking style of the user and the at least two mutually-perpendicular components of the sensed acceleration.

14. The machine-readable storage medium of claim 13, wherein determining the walking style of the user comprises determining the walking style of the user as one of the known walking styles based on the comparison of the determined at least one of the trough and crest values with the plurality of training trough and crest values.

* * * * *